United States Patent
Svarczkopf et al.

(10) Patent No.: US 9,027,646 B2
(45) Date of Patent: May 12, 2015

(54) FRACTURING FLUID WATER REUSE SYSTEM AND METHOD

(75) Inventors: Timothy C. Svarczkopf, Moon Township, PA (US); Dalton R. Weaver, III, Derry, PA (US); Jon M. Bender, Uniontown, PA (US); Jesse J. Strickler, Pittsburg, PA (US)

(73) Assignee: Chevron U.S.A. Inc., San Ramon, CA (US)

( * ) Notice: Subject to any disclaimer, the term of this patent is extended or adjusted under 35 U.S.C. 154(b) by 571 days.

(21) Appl. No.: 13/192,708

(22) Filed: Jul. 28, 2011

(65) Prior Publication Data

US 2012/0024525 A1 Feb. 2, 2012

Related U.S. Application Data (60) Provisional application No. 61/368,425, filed on Jul. 28, 2010.

(51) Int. Cl.
*E21B 43/16* (2006.01)
*C09K 8/62* (2006.01)
*C09K 8/72* (2006.01)

(52) U.S. Cl.
CPC .... *C09K 8/62* (2013.01); *C09K 8/72* (2013.01)

(58) Field of Classification Search
CPC ....... E21B 21/068; E21B 43/34; E21B 43/40; C02F 2201/4618; C02F 2209/05; C02F 1/722; C09K 8/62; C09K 8/72
See application file for complete search history.

(56) References Cited

U.S. PATENT DOCUMENTS

| | | | | |
|---|---|---|---|---|
| 4,872,959 A * | 10/1989 | Herbst et al. | | 205/566 |
| 5,068,038 A * | 11/1991 | Fischer et al. | | 210/662 |
| 5,425,422 A * | 6/1995 | Jamaluddin et al. | | 166/267 |
| 5,520,483 A * | 5/1996 | Vigneri | | 210/747.8 |
| 6,126,838 A * | 10/2000 | Huang et al. | | 210/712 |
| 6,358,398 B1 * | 3/2002 | Halldorson et al. | | 205/754 |
| 6,576,144 B1 * | 6/2003 | Vineyard | | 210/758 |
| 7,004,254 B1 * | 2/2006 | Chatterji et al. | | 166/279 |
| 7,159,658 B2 * | 1/2007 | Frost et al. | | 166/300 |
| 7,326,002 B2 * | 2/2008 | Kerfoot | | 405/128.25 |
| 2003/0228985 A1 | 12/2003 | Taylor et al. | | |
| 2005/0090404 A1 | 4/2005 | Ballard et al. | | |

(Continued)

OTHER PUBLICATIONS

Gao, Y.X. et al. "Treatment of oilfield wastewater by Fenton's process." Water Science and Technology, 2004, vol. 49, No. 4, 103-108.*

(Continued)

*Primary Examiner* — Angela M DiTrani
*Assistant Examiner* — Andrew H Sue-Ako
(74) *Attorney, Agent, or Firm* — Nicholas F. Gallo (57) ABSTRACT

Methods of processing a fluid recovered from an oil or gas extraction operation for reuse in a hydraulic fracturing fluid are described. The methods include providing an amount of a produced fluid composition containing iron and suspended solids and controlling at least one of the conductivity, iron content, oxidative strength, and pH of the composition, such that Fenton's reagent is formed in situ. Also described are hydraulic fracturing fluids produced using fluid recovered from an oil or gas production process and treated in accordance with the methods described herein as well as systems for preparing a hydraulic fracturing fluid having, as a fluid source, fluid recovered from an oil or gas production process that has been treated in accordance with the methods described herein.

25 Claims, 1 Drawing Sheet

(56) References Cited

U.S. PATENT DOCUMENTS

| | | | |
|---|---|---|---|
| 2005/0109610 A1* | 5/2005 | Inamoto et al. | 204/229.5 |
| 2005/0274678 A1* | 12/2005 | Chen et al. | 210/722 |
| 2006/0041028 A1 | 2/2006 | Crews | |
| 2006/0131214 A1* | 6/2006 | de Souza et al. | 208/196 |
| 2006/0135372 A1 | 6/2006 | Hossaini et al. | |
| 2007/0102359 A1* | 5/2007 | Lombardi et al. | 210/639 |
| 2008/0190609 A1* | 8/2008 | Robb et al. | 166/279 |
| 2008/0237141 A1* | 10/2008 | Kerfoot | 210/739 |
| 2009/0298720 A1 | 12/2009 | Nguyen et al. | |
| 2010/0125044 A1* | 5/2010 | Keister | 507/200 |
| 2010/0185039 A1* | 7/2010 | Hoag et al. | 588/320 |
| 2010/0307753 A1* | 12/2010 | Rey et al. | 166/305.1 |

OTHER PUBLICATIONS

Hayes, "Sampling and Analysis of Water Streams Associated with the Development of Marcellus Shale Gas," Marcellus Shale Coalition, Dec. 31, 2009.*

PCT Search Report and Written Opinion of the International Searching Authority, PCT/US2011/045749, Feb. 27, 2012.

* cited by examiner

US 9,027,646 B2

FRACTURING FLUID WATER REUSE SYSTEM AND METHOD

CROSS REFERENCE TO RELATED APPLICATION

This application claims priority to U.S. Provisional Patent Application No. 61/368,425, filed on Jul. 28, 2010, the entire contents of which are hereby incorporated by reference herein.

BACKGROUND OF THE INVENTION

1. Field of the Invention

This application relates to methods and systems for treating fluids recovered from a subsurface oil or gas production process. More specifically, this application relates to methods and systems of treating flow back and/or production brine and preparing hydraulic fracturing fluids comprising the treated flow back and/or production brine.

2. Description of Related Art

Hydraulic fracturing, also referred to as "hydrofracking," is a technique commonly used in the removal of oil and gas from subsurface rock formation reservoirs, and especially shale reservoirs. Hydraulic fracturing works by increasing the pressure in the formation rock so that fractures form. The fractures in the formation rock provide a pathway through which gas or oil can travel to the well bore. Fracture formation across a wide underground area also increases the area of the reservoir which can be accessed by a single well bore. Absent the formation of fractures in the rock formation, the porosity and permeability of the rock may be too low to allow for oil and gas to be recovered therefrom at an economic rate. This is especially true of shale reservoirs, which typically have an extremely low natural permeability.

Hydraulic fractures are traditionally created by pumping a fracturing fluid into a wellbore at a rate sufficient to increase the pressure downhole to a value in excess of the fracture strength of the formation rock. The increased pressure due to the high-pressure pumping of the fracturing fluid causes cracks to form in the formation. The fracturing fluid then can enter these cracks and extend the crack further into the formation. Often times, a solid proppant is added to the fracture fluid to keep the cracks open after injection ceases.

Significant amounts of fracturing fluid, e.g., 1,000,000 gallons or more per well, may be needed to create the pressure necessary to cause fractures to occur. The fracturing fluid is typically primarily composed of water, which may be unavailable locally. The costs associated with transporting and storing water from other sources can greatly impact the economic viability of hydrofracturing-based oil and gas recovery.

In a typical operation of a gas well that undergoes hydraulic fracturing, water is expelled from the rock formation after injection of the fracturing fluid and subsequent thereto during the production of gas as part of the produced fluid from the well. This water may initially be a return of the fracturing fluid, often referred to as flow back water. Then, the produced fluid may transition to a content that is primarily natural formation water, or connate water, present in the formation that is forced to the surface as a result of the hydrofracturing operation, also referred to as production brine. The produced fluid recovered at the surface may contain contaminants, such as minerals that were part of the subsurface formation as well as chemicals that were injected as part of the fracturing fluid. Treatment and disposal of this produced fluid can add to the complexity and cost of the well's operation, typically requiring capturing and shipping the fluid to treatment facilities. While methods of reusing the produced fluid in a productive way have been explored in the past, the industry is constantly searching for improved uses of the produced water.

SUMMARY

In one non-limiting embodiment, the invention is directed to a method of processing fluid recovered from an oil or gas extraction operation for reuse in a hydraulic fracturing fluid, including providing an amount of a produced fluid composition containing iron and suspended solids and controlling at least one of the conductivity, iron content, oxidative strength, and pH of the composition such that Fenton's reagent is formed in situ.

In some non-limiting embodiments of the inventive method, reaction of the Fenton's reagent can cause formation of complexes of iron and the suspended solids, which can cause coagulation and flocculation of the suspended solids.

In certain non-limiting embodiments of the inventive method, the conductivity of the composition can be at least 10,000 μmhos/cm. The conductivity can be controlled, for example, through the addition of production brine having a conductivity of at least 150,000 μmhos/cm.

In some non-limiting embodiments of the inventive method, the iron content of the composition can be at least 5 ppm. The iron content can be controlled, for example, through the addition of an iron salt to the composition.

By way of example, controlling the oxidative strength of the composition according to the inventive method can be done by one or more of the following: addition of hydrogen peroxide, addition of peracetic acid, and aeration of the composition.

In certain non-limiting examples, the pH of the composition is controlled to be between 5.0 and 6.5.

Non-limiting examples of the suspended solids include kerogen, asphaltenes, acrylamide solids, and combinations thereof.

In certain non-limiting examples, the method of the invention further includes adding to the composition a friction reducer, non-limiting examples of which include at least one of an acrylic-acid-AMPS-polyacrylamide terpolymer, a brine dispersion AMPS-polyacrylamide copolymer, and a non-ionic polyacrylamide polymer. In some non-limiting embodiments, the friction reducer can be pre-treated in an aqueous solution to increase the hydration thereof.

In some non-limiting embodiments, the method of the invention further includes adding to the composition a scale inhibitor, a non-limiting example of which is a sulphonated phosphinocarboxylic acid copolymer.

In certain non-limiting embodiments, the invention further includes adding to the composition an iron dispersant, such as a sulphonated, carboxylated, non-ionic terpolymer.

In some non-limiting embodiments, the composition can be mixed at a rate and frequency sufficient to prevent the occurrence of density-based striation.

In another non-limiting embodiment, the invention is directed to a method of reusing a produced fluid in a hydraulic fracturing operation including receiving the produced fluid from a well as a return of at least a hydraulic fracturing fluid in a hydraulic fracturing operation; providing a production brine recovered from an oil or gas extraction operation, the production brine having a conductivity of at least 150,000 μmhos/cm; measuring a conductivity of the produced fluid; treating the produced fluid by adding thereto at least the production brine to form a treated produced fluid in which Fenton's reagent forms in situ, wherein the treating of the produced fluid includes increasing the conductivity of the produced fluid to at least 10,000 μmhos/cm, increasing an iron content of the produced fluid to at least 5 ppm, and increasing an oxidation-reduction potential value of the produced fluid to at least 250 mV; storing the treated produced fluid for a sufficient time to allow flocculation of suspended solids in the treated produced fluid, thereby forming a clarified produced fluid from which the suspended solids have been removed; and injecting the clarified produced fluid into a well as part of a hydraulic fracturing fluid.

In some non-limiting embodiments, treating the produced fluid includes increasing the conductivity of the produced fluid to at least 150,000 μmhos/cm and increasing the iron content of the produced fluid to at least 50 ppm. Treating the produced fluid may also include adding an acid to the produced fluid to adjust the pH level of the produced fluid to between about 5.0 and about 6.5.

In some non-limiting embodiments, the method of the invention can additionally include adding a friction reducer to the clarified produced fluid, the friction reducer being mixed with at least one of the clarified produced fluid or an aqueous solution for unwinding at least one hour before the step of injecting the clarified produced fluid into the well.

In certain non-limiting embodiments, the method further includes mixing the clarified produced fluid at a rate and frequency sufficient to prevent the occurrence of density-based striation.

Another non-limiting embodiment of the invention is a hydraulic fracturing fluid which includes fluid recovered from an oil or gas production process treated in accordance with a method described herein. In some non-limiting embodiments, the fluid recovered from an oil or gas production process includes flow back water and production brine. The hydraulic fracturing fluid may additionally include one or more of a friction reducer, an iron dispersant, and a scale inhibitor. In one non-limiting embodiment, the friction reducer is at least one of an acrylic-acid-AMPS-polyacrylamide terpolymer, a brine dispersion AMPS-polyacrylamide copolymer, and a non-ionic polyacrylamide polymer.

In another non-limiting embodiment, the invention is directed to a system for preparing a hydraulic fracturing fluid, the system having, in series for fluid flow therebetween, a fluid source which includes fluid recovered from an oil or gas production process that has been treated in accordance with a method described herein, a friction reducer inlet for supplying a friction reducer, and a mixing apparatus. In some non-limiting embodiments, the system further includes a friction reducer holding tank for pre-treating the friction reducer in an aqueous solution and/or an in-line conductivity analyzer between the fluid source and the mixing apparatus. Data from the conductivity analyzer may be provided to a feedback control system for adjusting the amount and type of friction reducer added to the hydraulic fracturing fluid.

Potential advantages of the invention include, but are not limited to, significantly reducing the costs associated with the reuse or disposal of produced fluid, reducing the costs of the fracturing fluid chemicals, reducing the costs associated with transporting fresh water to the well site, increasing well production by between 10 and 20%, and reducing the specific ion production in the produced water that causes increased treatment costs.

These and other advantages of the present invention will be appreciated in view of the drawings and detailed description provided below.

DETAILED DESCRIPTION

Figure 1:
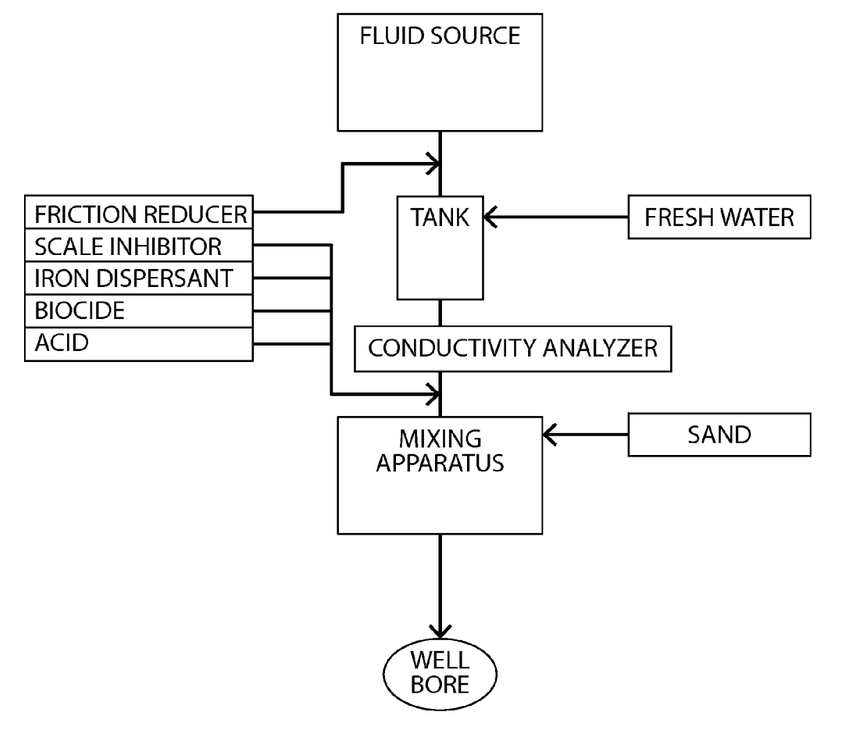
The FIGURE shows a schematic for a system for preparing hydraulic fracturing fluid according to one aspect of the current invention.

Other than in the operating examples, or where otherwise indicated, all numbers expressing quantities of ingredients, thermal conditions, and so forth used in herein are to be understood as being modified in all instances by the term "about." Accordingly, unless indicated to the contrary, the numerical parameters set forth herein are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

Provided are methods and systems for treating fluid produced during an oil and/or gas subsurface extraction operation and using the treated fluid in preparing a hydraulic fracturing fluid. The methods and systems described herein provide not only a manner of treating otherwise difficult to treat byproducts of the hydraulic fracturing process, but also a means to reuse these byproducts in future hydraulic fracturing operations. In view of the discussion herein, the economic and environmental benefits of this invention will become readily appreciated by those skilled in the art.

For purposes of this application, the term "fracturing fluid" or "hydraulic fracturing fluid" is intended to mean fluid that is injected into the ground for performing hydraulic fracturing of a subsurface formation, as is typically understood by those skilled in the art. While fracturing fluid is generally composed primarily of water, fracturing fluid also includes various additives that affect the ability of the fracturing fluid to perform its intended function. Non-limiting examples of such additives include friction reducers, scale inhibitors, biocides, and dispersants, such as iron dispersants.

For purposes of this application, the term "produced fluid" is intended to mean fluid that is recovered as part of a hydraulic fracturing oil or gas subsurface extraction operation. As is appreciated by those skilled in the art, produced fluid can include both water from the subsurface formation, often referred to as "production brine" or "production water," along with fluid composed primarily of spent fracturing fluid previously injected into the well, generally referred to as "flow back water." Production brine is typically characterized as being a highly ionic, and thereby conductive, aqueous solution. In certain regions, such as in the Marcellus Shale region, production brine is also characterized as having a high iron content. Flow back water is commonly dark in color due to high amounts of suspended organic solids, including both naturally occurring compounds from the subsurface formation, such as kerogen and asphaltenes, and synthetic compounds from the hydraulic fracturing fluid, such as residual acrylamide solids.

During the typical hydraulic fracturing oil or gas extraction process, the initial fluid recovered consists primarily of flow back water while the production brine is typically recovered from the well after the fracturing operation is complete and the well is producing gas and/or oil. The composition of the produced fluid can be said to be time dependent in that the composition will change over the course of a hydraulic fracturing and subsequent gas and/or oil extraction process. The composition of the produced fluid is also dictated, at least in part, by the compositional make-up of the formation water present in the subsurface formation, the composition of the subsurface rock, and the composition of the fracturing fluid which makes its way back to the surface of the wellbore. For example, an exemplary geochemical analysis of a particular subsurface formation in the Marcellus Shale region is provided below in Table 1:

TABLE 1

Subsurface Composition

| Constituent | Weight Composition Range (%) | Geochemistry |
|---|---|---|
| Illite + Mica | 25 to 35 | $(K, H_3O)(Al, Mg, Fe)_2(Si, Al)_4O_{10}[(OH)_2, (H_2O)]$ $X_2Y_{4-6}Z_8O_{20}(OH, F)_4$ X is K, Na, or Ca or less commonly Ba, Rb, or Cs; Y is Al, Mg, or Fe or less commonly Mn, Cr, Ti, Li, Z is chiefly Si or Al but also may include $Fe^{3+}$ |
| Chlorite | 5 to 15 | $(Mg, Fe)_3(Si, Al)_4O_{10}$ $(OH)_2 \bullet (Mg, Fe)_3(OH)_6$ |
| Silica Quartz | 20 to 40 | $SiO_2$ |
| Kerogen + Bitumen (TOC) | 6 to 10 | Organic |

TABLE 1-continued

Subsurface Composition

| Constituent | Weight Composition Range (%) | Geochemistry |
|---|---|---|
| Feldspar | 0 to 5 | $KAlSi_3O_8$—$NaAlSi_3O_8$—$CaAl_2Si_2O_8$ |
| Calcite + Dolomite | 5 to 25 | $CaCO_3 + CaMg(CO3)2$ |
| Pyrite | 5 to 10 | $FeS_2$ |

It is thus generally expected that the produced fluid which is recovered includes particles and compounds which exist naturally in the subsurface formation as well as particles and compounds present in the fracturing fluid. Despite the many variables which affect the composition of produced fluid, the methods and systems described herein are expected to function across a wide range of subsurface formations, fracturing fluid chemistries, and thus produced fluid compositions.

A method according to the present invention can include at least two stages: a first stage involving the treatment of produced fluid through in situ formation of Fenton's reagent and a second stage involving the formulation of a fracturing fluid using the produced fluid that has been subjected to this treatment. However, as will be appreciated, these stages are not independent of one another but are interrelated, which allows opportunities for each stage to be planned and/or modified in a way to synergistically affect the other.

Treatment of the produced fluid will be discussed first. As described above, hydraulic fracturing typically requires injecting large amounts of fracturing fluid into a wellbore. As a result of this injection, produced fluid begins coming to the surface of the well where it can be recovered. This produced fluid, at least initially, is made up primarily of flow back water and includes both particles and compounds from the injected hydraulic fracturing fluid and naturally occurring particles and compounds picked up from the formation itself. The produced water can also include a certain amount of production brine released by the formation. While, as mentioned above, the composition and other characteristics of the produced fluid depends on many factors, including the make-up of the hydraulic fracturing fluid used and the composition of the subsurface formation, an exemplary summary of produced fluid recovered from a wellbore in the Marcellus Shale formation at 20,000 barrel intervals is provided below in Table 2:

TABLE 2

Produced Fluid Analysis

| Analysis | begin | 20,000 bbl | 40,000 bbl | 60,000 bbl | 80,000 bbl | units |
|---|---|---|---|---|---|---|
| pH | 6.77 | 6.76 | 6.72 | 6.67 | 6.63 | |
| Conductivity | 36,900.0 | 37,400.0 | 38,600.0 | 40,200.0 | 41,500.0 | µmhos/cm |
| Specific Gravity | 1.020 | 1.012 | 1.012 | 1.020 | 1.020 | |
| Fluid Density | 8.51 | 8.44 | 8.44 | 8.51 | 8.51 | lb/gal |
| Approx. Salt Percentage | 7.3 | 7.7 | 7.8 | 8.1 | 7.0 | % |
| Ca | 1,425.0 | 1,576.0 | 1,149.0 | 1,466.0 | 1,330.0 | mg/L |
| Ca Hardness | 3,562.5 | 3,940.0 | 2,872.5 | 3,665.0 | 3,325.0 | mg/L |
| Mg | 190.7 | 207.2 | 153.9 | 182.9 | 169.5 | mg/L |
| Mg Hardness | 781.9 | 849.5 | 631.0 | 749.9 | 695.0 | mg/L |
| Total Hardness | 4,344.4 | 4,789.5 | 3,503.5 | 4,419.9 | 4,020.0 | mg/L |
| Total Iron | 1.4 | 1.7 | 1.4 | 2.0 | 1.9 | mg/L |
| Sulfates | 140.0 | 140.0 | 130.0 | 140.0 | 120.0 | mg/L |
| ATP | N/A | N/A | N/A | N/A | N/A | |
| Carbonate Alkalinity | 0.0 | 0.0 | 0.0 | 0.0 | 0.0 | mg/L |
| Bicarbonate Alkalinity | 463.6 | 427.0 | 378.2 | 378.2 | 512.4 | mg/L |
| Total | 463.6 | 427.0 | 378.2 | 378.2 | 512.4 | mg/L |
| Barium | 9.86 | 10.60 | 6.41 | 10.63 | 7.00 | mg/L |

TABLE 2-continued

Produced Fluid Analysis

| Strontium | 326.0 | 351.6 | 265.6 | 328.9 | 306.1 | mg/L |
|---|---|---|---|---|---|---|
| Analysis | 100,000 bbl | 120,000 bbl | 140,000 bbl | 160,000 bbl | 180,000 bbl | 200,000 bbl | units |
| pH | 6.6 | 6.47 | 6.16 | 6.31 | 5.79 | 5.24 | |
| Conductivity | 42,100.0 | 49,700.0 | 93,400.0 | 70,800.0 | 157,000.0 | 216,000.0 | μmhos/cm |
| Specific Gravity | 1.023 | 1.020 | 1.060 | 1.035 | 1.100 | 1.185 | |
| Fluid Density | 8.53 | 8.51 | 8.84 | 8.63 | 9.17 | 9.88 | lb/gal |
| Approx. Salt Percentage | 7.1 | 7.9 | 8.6 | 8.1 | 18.6 | 29.3 | % |
| Ca | 1,670.0 | 2,235.0 | 7,030.0 | 4,455.0 | 14,669.0 | 22,797.0 | mg/L |
| Ca Hardness | 4,175.0 | 5,587.5 | 17,575.0 | 11,137.5 | 36,672.5 | 56,992.5 | mg/L |
| Mg | 204.8 | 251.9 | 618.9 | 411.1 | 1,184.0 | 1,881.0 | mg/L |
| Mg Hardness | 839.7 | 1,032.8 | 2,537.5 | 1,685.5 | 4,854.4 | 7,712.1 | mg/L |
| Total Hardness | 5,014.7 | 6,620.3 | 20,112.5 | 12,823.0 | 41,526.9 | 64,704.6 | mg/L |
| Total Iron | 2.5 | 3.5 | 7.4 | 3.6 | 35.9 | 63.4 | mg/L |
| Sulfates | 110.0 | 70.0 | 70.0 | 40.0 | 20.0 | 50.0 | mg/L |
| ATP | N/A | N/A | N/A | N/A | N/A | N/A | |
| Carbonate Alkalinity | 0.0 | 0.0 | 0.0 | 0.0 | 0.0 | 0.0 | mg/L |
| Bicarbonate Alkalinity | 439.2 | 427.0 | 390.4 | 329.4 | 341.6 | 402.6 | mg/L |
| Total | 439.2 | 427.0 | 390.4 | 329.4 | 341.6 | 402.6 | mg/L |
| Barium | 8.63 | 11.95 | 233.30 | 116.30 | 800.10 | 1,447.00 | mg/L |
| Strontium | 371.5 | 496.4 | 1403.0 | 920.0 | 2809.0 | 4,555.0 | mg/L |

According to one method of the invention, the produced fluid, once separated from the oil and/or gas, can be stored or housed for treatment. In one non-limiting embodiment, the produced fluid is stored on-site, such as in a large storage pit located near the wellbore. While the produced fluid stored at a particular storage location may come entirely from a single well, the invention is not so limited, and produced fluid from a variety of well sites can be transported and combined into one or more storage locations.

Treatment of the collected produced fluid according to the present invention involves controlling one or more of several key characteristics of the produced fluid in order to promote in situ formation of Fenton's reagent, the effect of which will be appreciated below.

Fenton's reagent involves oxidation of ferrous iron (II) to ferric iron (III), a hydroxyl radical and a hydroxyl anion in the presence of an oxidation agent followed by reduction of the ferric iron (III) back to ferrous iron (II), a peroxide radical and a proton according to the following two-part reaction scheme:

$$Fe^{2+} + H_2O_2 \rightarrow Fe^{3+} + OH\cdot + OH^- \quad (1)$$

$$Fe^{3+} + H_2O_2 \rightarrow Fe^{2+} + OOH\cdot + H^+ \quad (2)$$

Through the control, adjustment, and regulation of certain characteristics of a produced fluid composition, non-limiting examples of which include the conductivity, iron content, oxidative strength, and pH of the composition, in situ production of Fenton's reagent can be made to occur and further can be used to treat and clarify the produced fluid composition, thereby making it suitable for use (or, more aptly, reuse) in a hydraulic fracturing fluid.

Conductivity of a fluid sample is commonly understood to be the ability of the sample to conduct an electric current. Conductivity generally depends on the level of dissolved ions in the fluid, with an increase in dissolved ions leading to an increase in conductivity. Controlling the conductivity of a produced fluid composition has been found to be important in ensuring in situ production of Fenton's reagent. The conductivity of a particular produced fluid sample can vary depending on, among other factors, the subsurface composition and the hydraulic fracturing fluid composition. The conductivity of the produced fluid also has a time dependence aspect to it, with produced fluid recovered near the beginning of the fracturing operation, typically comprised of mainly flow back water, often having different, and generally lower, conductivity than subsequently recovered produced fluid, which may be composed of some (or mainly) production brine. By way of example, the conductivity of produced fluid recovered from a wellbore drilled in the Marcellus Shale formation has been found to average between about 20,000 and 80,000 μmhos/cm during the initial flow back water period. Table 2, above, provides an analysis of the conductivity of a produced fluid sample from the Marcellus Shale region over a period of time. As can be seen from this data, in this particular well, which is typical of Marcellus Shale wells, the conductivity of the produced fluid recovered at a given time increases over time as more and more fluid has been recovered. According to one embodiment of the present invention, to ensure Fenton's reagent can be produced in situ with reasonable levels of iron and oxidative strength, the conductivity of the produced fluid composition should preferably be above about 10,000 μmhos/cm, more preferably above about 50,000 μmhos/cm, such as above 100,000 μmhos/cm, and most preferably above about 150,000 μmhos/cm to ensure Fenton's reagent can be produced in situ with reasonable levels of iron and oxidative strength.

Of course, controlling the conductivity to ensure it is at a level that is suitable for in situ production of Fenton's reagent according to the present method may or may not require adjusting the conductivity of the produced fluid that has been recovered and is ready for treatment. In the event such adjustment is required, the conductivity can be increased by adding ions, preferably in the form of soluble salts, to the produced fluid composition. A preferred means of increasing the conductivity in this manner involves the use of production brine which, as discussed above, is another natural byproduct of the hydraulic fracturing operation. While, in some cases, the recovered produced fluid composition will already contain a certain amount of production brine, adding additional production brine to the produced fluid composition to prepare the composition for treatment may still be appropriate to increase the overall conductivity of the composition. Production brine typically has a high salinity value, and is thus highly conductive. Use of production brine is advantageous because it is a readily available byproduct of many hydraulic fracturing operations. In addition, the use of production brine as part of the process for treating produced fluid provides an opportunity to reuse production brine, which would otherwise normally be disposed of according to the appropriate environmental guidelines.

While production brine is generally understood as constituting a highly conductive fluid, the conductivity of any particular sample of production brine may vary based on the natural conditions and make-up of the subsurface formation from which the production brine is recovered. In the Marcellus Shale region, for example, production brine is highly ionic, generally having a conductivity of approximately 200,000 to 300,000 µmhos/cm. Particularly useful production brine for use in the methods described herein has a conductivity of at least 150,000 µmhos/cm, with higher values, such as between about 200,000 to 300,000 µmhos/cm being preferred. By way of example, the produced fluid composition can comprise between about 10% and 75% production brine by volume, with between 25% and 50% by volume production brine being preferred.

The conductivity can also be decreased by the addition of fresh water, sometimes referred to in the industry as "make-up water," which typically has a lower conductivity than produced fluid.

In addition to conductivity, another non-limiting example of a characteristic of the produced fluid composition to be treated that should be controlled and, as necessary, adjusted in order to promote in situ production of Fenton's reagent is the iron content of the produced fluid composition. Controlling the iron content is important in the in situ production of Fenton's reagent due to the role of iron in initiating the Fenton's reagent reaction scheme. Absent an adequate level of iron, the Fenton's reagent reaction will not occur. Iron is generally present in the produced fluid in its soluble $Fe^{2+}$ (ferrous) state. Like the conductivity, the iron content of produced fluid depends on many factors, such as the make-up of the subsurface formation and, to a lesser extent, the composition of the hydraulic fracturing fluid injected into the ground. The produced fluid iron content also is generally observed to have a certain time dependence to it, with the iron level of a particular produced fluid sample varying over time. Table 2 illustrates this effect, with the iron content of the produced fluid recovered varying from 1.4 mg/L at the outset to 63.4 mg/L after recovery of 200,000 barrels of produced fluid. According to the present invention, the iron content of the produced fluid composition to be treated should preferably be above about 5 ppm, and more preferably above about 25 ppm, such as above about 50 ppm or between about 25 ppm and 60 ppm, to ensure Fenton's reagent can be produced in situ with reasonable levels of conductivity and oxidative strength.

While, depending on the iron content of the produced fluid composition to be treated, it may or may not be necessary to adjust the iron content of the composition to promote in situ production of Fenton's reagent according to the present method, iron content can be adjusted in several ways. One non-limiting manner of adjusting the iron content is through the addition to the composition of iron, preferably through the addition of soluble iron salts such as ferric sulfate or ferric chloride. Ferric chloride can also provide an additional benefit of limiting sulfate content.

The iron content of a produced fluid composition can also be increased through the addition of production brine having high iron content. As discussed above, the addition of production brine to the produced fluid composition is advantageous because it is a readily available byproduct of many hydraulic fracturing operations and represents a productive reuse of this material. The iron content of a particular production brine sample may vary based on the natural conditions and make-up of the subsurface formation from which the production brine is recovered. For example, in the Marcellus Shale region, production brine typically has an iron content of approximately 150 ppm. Particularly useful production brine for use in the methods described herein has an iron content of at least 50 ppm, with higher values, such as between about 100 and 175 ppm being preferred. The iron content can be decreased by the addition of make-up water.

In addition to conductivity and iron content, another non-limiting example of a characteristic of the produced fluid composition to be treated that should be controlled and, as necessary, adjusted in order to promote in situ production of Fenton's reagent is the oxidative strength (i.e. oxidizing strength, oxidation strength) of the produced fluid composition. Controlling the oxidative strength of the composition is important in the in situ production of Fenton's reagent due to the need for a sufficient amount of an oxidation agent to initiate the Fenton's reagent reaction scheme. The oxidative strength can be measured as the oxidation-reduction potential (ORP) of the composition. In one embodiment, preferred ORP values can be between 250 and 650 mV.

Oxidative strength can be adjusted in various ways. One such way is through aeration of the produced fluid composition using, for example, a pumping or mixing arrangement to circulate the composition. Such mixing should be sufficient to prevent density striation (or significant density striation) from occurring within the treatment site as the denser brine will have a tendency to gravitate toward the bottom of the treatment site. Mixing can be accomplished by drawing produced fluid located at or near the bottom of the treatment site and circulating it back to the top of the produced fluid composition. This mixing process also provides an opportunity to add chemicals to the produced fluid composition, such as the oxidants mentioned below, or chemicals used to adjust the pH of the composition, also discussed below.

Another way of increasing the oxidative strength is through the addition of hydrogen peroxide, peracetic acid, or another similar oxidant to the produced fluid composition.

The amount of oxidative strength required is also temperature dependent, which dependency may be caused by fluctuations in the growth of biofilm, or microorganisms, within or on the surface of the fluid at different temperatures. In regions that experience seasonal temperature fluctuations, this means that additional oxidative strength may be required in the summer months versus what is required or desired in the summer months. Thus, in some cases, the treatments for changing oxidative strength may be adjusted as a function of ambient temperature and/or season.

In one non-limiting embodiment, the conductivity of the produced fluid composition subject to treatment according to the method described herein is at least at least 150,000 µmhos/cm. In the Marcellus Shale region, it has been found that such level can be achieved by creating a mixture of approximately 50% by volume production brine and 50% by volume of flow back water followed by aeration of the composition. During the summer months, biological growth in treatment locations such as storage pits may prevent sufficient oxidation. In order to add additional oxidative strength to the composition, an oxidation agent such as hydrogen peroxide can also be added.

The pH level of the produced fluid composition should ideally be maintained in the slightly acidic range. In particular, the produced fluid composition should have a pH of between about 5.0 and about 6.5 at least at the end of treatment, and ideally throughout the treatment process. A pH in this range has been found to improve the efficiency of the Fenton's reagent, improves compatibility with the formation, and reduces microbiological growth. Hydrochloric acid or another acid may be added to the produced fluid to lower the pH as necessary.

Once the composition of the produced fluid is adequately adjusted through the control of at least one or more of the pH, conductivity, iron content, and oxidative strength of the composition, in situ Fenton's reagent can form. While the present invention is not limited to any particular theory of operation, it has been found that formation of Fenton's reagent through the present method allows iron complexes to form in the composition. More particularly, it has been found that through the method described herein, the iron in the produced fluid sample form complexes with the suspended solids in the produced fluid sample, including those produced solids generally present in flow back water, such as kerogen, asphaltenes, and residual acrylamide compounds from the hydraulic fracturing fluid. In particular, the iron ions form a nucleation site around which suspended solids coagulate to induce a flocculation effect within the composition. Eventually, as the coagulation of suspended solids around the nucleation site continues to grow in diameter and mass, the coagulated mass will reach its critical size according to Stokes' law and settle out of the produced fluid by gravitating to the bottom of the treatment site, be it a pit or other suitable receptacle. Through this process, undesirable suspended solids, such as kerogen, asphaltenes, and residual acrylamide compounds, can be removed from the produced fluid composition. In addition, the iron content of the produced fluid composition is also reduced through the coagulation and flocculation process. Once sufficient time has passed to allow sufficient flocculation of the suspended solids, the treated produced fluid composition can be removed from the treatment location, preferably by pumping the treated produced fluid from at or near the top of the treatment site. The coagulated mass of suspended solids and iron can be removed from the bottom of the treatment site through a vacuum or other suitable apparatus, e.g., once most of the treated produced fluid has been removed.

The method described herein can additionally include combining the produced fluid that has been treated as discussed above with other additives and/or additional fluids (such as fresh make up water), to formulate a hydraulic fracturing fluid. Because the produced fluid treated in the manner described above may still have a high concentration of divalent cations, the additives selected for this stage of the process should be selected with the composition of the treated produced fluid in mind to achieve ideal compatibility between the various compounds of the hydraulic fracturing fluid ultimately produced. Compatibility with the barium, strontium, calcium, and magnesium levels in the formation water is particularly important. The additives should ideally be either non-ionic, amphoteric, or anionic in charge.

One such additive that can be added is a friction reducer. Friction reducers are commonly employed in hydraulic fracturing fluids and are generally known in the art. Preferred friction reducers according to the present invention include polymeric friction reducers, such as derivatives of acrylamide copolymers or acid salts thereof and non-ionic polyacrylamide friction reducers. Examples of suitable acrylamide derivatives copolymers include those containing 2-acrylamido-2-methylpropane sulfonic acid (AMPS), such as an acrylic acid-AMPS-polyacrylamide terpolymer and AMPS-polyacrylamide copolymers, copolymers of N,N-dimethylacrylamide and 2-acrylamido-2-methylpropanesulfonic acid, and acid salts thereof. Useful friction reducers also include ASP-900 brine dispersion available from Nalco, Inc., HE® SERIES 150 POLYMER, a polymer suspension in isoalkane oil available from Chevron Phillips Chemical Company, dimethylaminoethyl methacrylate (DMAEM) quaternary salt, and dimethylaminopropyl methacrylamide (DMAPM) quarternary salt.

The friction reducer can be added to the produced fluid composition so that the friction reducer concentration, based on the total volume of the fracturing fluid, is between 250 and 3000 ppmV (parts-per-million by volume), such as about 1000 ppmV.

It has also been found that the friction reducer should be selected based on the conductivity of the produced fluid composition. For example, it has been found that, for a composition having a conductivity of between 0 and 70,000 µmhos/cm, a non-ionic or near non-ionic polyacrylamide friction reducer should be used, for a composition having a conductivity of between 70,000 and 125,000 µmhos/cm, an acrylic acid, AMPS, polyacrylamide terpolymer friction reducer should be used, and for a composition having a conductivity over 125,000 µmhos/cm, such as between 125,000 µmhos/cm and 200,000 µmhos/cm, a brine dispersion AMPS, polyacrylamide co-polymer friction reducer should be used.

Of course, the conductivity of the composition can change based on what is added during the formulation of the hydraulic fracturing fluid. To account for this change, a device to measure the conductivity of the composition can be provided in-line, either downstream (as illustrated in the FIGURE) or upstream of the inlet point where the friction reducer is added to the composition, to determine the conductivity of the produced fluid at a given time. Based on the conductivity measured, the amount and type of friction reducer can be adjusted to better match with the conductivity of the composition.

In another non-limiting embodiment, the friction reducer, prior to being added to the composition, can be first pre-treated in an aqueous solution, such as in a holding tank filled with water. This pre-treatment process is particularly advantageous for polymeric friction reducers that are initially in a wound state, and the pre-treatment allows the friction reducer to unwind, thereby making it more efficient. The residence time of the friction reducer in the pre-treatment aqueous solution can be more than an hour, such as about two hours.

Another component which can be added to the composition to formulate a fracturing fluid is a surfactant. The surfactant is preferably nonionic or anionic in charge, stable at low pH and stable in solutions with a high amount of dissolved solids. Demulsifying wetting agents including, for example, DDBSA/ETO-PPO nonyl phenol blends or DDBSA/EO-PPO nonyl phenol blends, are particularly useful. Polypropylene glycol is also a non-limiting example of a useful surfactant. Other non-limiting examples include DS-504/DS-505 available from Baker Petrolite and DREWSPERSE® 739 ANTIFOULANT, available from Drew Chemical Corporation.

The surfactant can be added to the fracturing fluid so that the surfactant concentration, based on the total volume of the fracturing fluid, is between 200 and 3000 ppmV, such as about 1000 ppmV.

Another component which can be added to the composition to formulate a fracturing fluid is a scale inhibitor, and particularly a polymeric scale inhibitor which can control barium sulfate, calcium sulfate, and calcium carbonate scale formation. Sulfates present in the fracturing fluid can combine with the barium to form barite or calcium crystals in the subsurface formation. For this reason, sulfates are typically avoided; however, use of a scale inhibitor (even with low sulfate compositions) can still be advantageous. Barite formation is particularly a concern in subsurface formations that have a high level of barium. In the Marcellus Shale region, for example, formation of barium scale is considerably more of a concern than formation of calcium scale given pH ranges embodied by the invention. The scale inhibitor preferably has a nonionic or anionic charge, is a dispersant rather than a sequestrant, and is in the acid form. Sulphonated compounds, such as sulphonated phosphinocarboxylic acid copolymers are preferred. Examples of useful scale inhibitors include phosphonic acid compounds, bis-hexamethylene triaminepenta (methylene phosphoric) acid (BHPMP), polyaspartic acid, sulphonated phosphinocarboxylic acid copolymer, such as BELLASOL® S50 available from BWA Water Additives, and carboxylate copolymer, such as ROMAX 7300 available from Rohm and Haas, and an acrylic acid/sulfonic acid copolymer. Suitable scale inhibitors can be used alone or in combination.

The scale inhibitor can be added so that the scale inhibitor concentration in the fracturing fluid, based on the total volume of the fracturing fluid, is between 200 and 1000 ppmV, such as about 200 ppmV.

Another component which can be added to the fracturing fluid is an iron dispersant. The iron dispersant preferably has a nonionic or anionic charge. Gluconic acid and polymeric iron sequestrants are preferred. The iron dispersant can be a sulphonated, carboxylated, nonionic terpolymer, such as a sulphonated styrene/maleic acid copolymer and/or an acrylic acid/AMPS (2-acrylamido-2-methylpropyl sulfonic acid) copolymer. One particular example is ACUMER 3100, available from Dow Chemicals. Suitable iron dispersants can be used alone or in combination.

The iron dispersant can be added so that the iron dispersant concentration in the fracturing fluid, based on the total volume of the fracturing fluid, is between 200 and 2000 ppmV, such as about 200 ppmV.

Another component which can be added to the composition to formulate a fracturing fluid is a biocide. The biocide functions primarily as an antimicrobial agent. The biocide is used to control and inhibit bacteria and fungi growth. Any biocide capable of use as an antimicrobial agent in water based applications may be useful, though biocides that are nonionic or anionic, stable at low pH, and stable solutions with high amounts of dissolved solids are preferred. Particularly useful biocides include gluteraldehyde, dibromo-nitrilopropionamide (DBNPA), and isothiazolone. One particular example is 2,2-Dibromo-3-Nitrilopropionamide (DBNPA) available commercially from The Dow Chemical Company. Suitable biocides can be used alone or in combination.

The biocide can be added so that the biocide concentration in the fracturing fluid, based on the total volume of the fracturing fluid, is between 200 and 500 ppmV, such as about 400 ppmV.

As mentioned above, fresh make up water can be added to the produced fluid composition when formulating a hydraulic fracturing fluid. Make up water has been found to have a generally advantageous effect on the effectiveness of at least the friction reducer.

Introducing additives and/or make up water to the produced fluid composition to formulate a hydraulic fracturing fluid can be accomplished in a variety of ways. In one non-limiting example, one or more of the additives/water can be added directly at the treatment site followed by performing a mixing operation using any of many known large volume mixing devices. Alternatively, as discussed above, a pumping system can be provided to cycle fluid from the treatment site through one or more mixing stations where one or more of the additives/water is added before returning the water to the treatment site. Such an operation can comprise a pump with an inlet connected at one end to a water treatment compound container which contains one or more of the treatment compounds. The water treatment compound(s) can then be added to the produced fluid as it circulates through the pump.

Alternatively, one or more of the chemicals could also be added at different points along the cycle line, such as between in-line mixers.

As another alternative, the produced fluid composition, once treated through the process of in situ formation of Fenton's reagent as described above, may be considered as a fluid source for reuse in an oil and/or gas extraction operation. For example, the produced fluid composition, once treated, can be transported to a location where it is used as a fluid source for the preparation of a hydraulic fracturing fluid that can be used in a hydrofracturing operation. An example of a system useful in preparing a hydraulic fracturing fluid is shown generally in the FIGURE. Such a system can include one or more tanks and additive/water inlets for addition of the additives and fresh water, culminating in a mixing apparatus, such as a blender, where additional components, such as sand, can be added, prior to injecting the hydraulic fracturing fluid into a wellbore. As mentioned above, a conductivity analyzer can be incorporated into the system to monitor the conductivity of the composition at various points, which conductivity information can be used as part of a feedback control system (not shown) to adjust the amount or type of additive (and particularly the amount or type of friction reducer) being added. These configurations are not meant to be limiting as other configurations are also contemplated.

As highlighted before, compatibility of all additives of the fracturing fluid with each other and with the subsurface formation is important to maximize effectiveness. With respect to the compounds added to the fracturing fluid, compatibility of all compounds can be tested with a zeta potential analyzer. In addition, friction reduction can be analyzed in a friction flow test loop, with rheology testing, and with surface tension testing. Surfactant compatibility can be determined with surface tension testing and scale inhibitor compatibility can be proven in scale loop and autoclave testing.

In one non-limiting embodiment, as part of the hydraulic fracturing operation, the well can be treated with an acid composition prior to or during injection of the hydraulic fracturing fluid. For example, prior to injecting the hydraulic fracturing fluid into the well bore, the well may be pre-treated with an acid composition injected into the well bore. Suitable acid pre-treatment compositions include approximately 5-10 wt % hydrochloric acid. Once injected into the well bore, the acid composition may act to solubilize calcium carbonate, calcite, and/or other compounds of the subsurface formation, and can help initiate the formation of cracks in the subsurface formation, thereby improving the efficacy of the hydraulic fracturing fluid. A friction reducer, such as one or more of the friction reducers discussed above, may be included in the acid composition during the pre-treatment of the well. Inclusion of a friction reducer in the acid composition during pre-treatment of the well has been found to increase the rate of subsurface crack formation, especially near the well bore, which can improve well productivity. Including a friction reducer during pre-treatment also improves perforation erosion efficiency, reduces friction within the well bore, and reduces the power requirements during acid treatment of the well compared to acid treatment without friction reducer as well as the total power requirements for the remainder of the hydraulic fracturing fluid injection process.

The following example illustrates the unexpected benefits of treating a sample of produced fluid according to the present invention.

EXAMPLE

In this example, Table 3 illustrates two produced fluid samples from a Marcellus Shale well after addition of approximately 50% by volume production brine thereto. As can be seen, the conductivity of the samples is slightly above 150,000 μmhos/cm and the iron content is above 50 ppm. Each sample was observed to be black in color, presumably due to the presence of high amounts of suspended solids such as kerogen, residual polyacrylamide, and biofilm.

TABLE 3

Produced Fluid Composition After Production Brine Addition

| Analysis | Pit #2 | Pit #3 | units |
|---|---|---|---|
| pH | 6.29 | 6.27 | |
| Conductivity | 157,400 | 162,700 | μmhos/cm |
| Specific Gravity | 1.106 | 1.120 | |
| Fluid Density | 9.22 | 9.34 | lb/gal |
| Approx. Salt Percentage | 19.6 | 17.2 | % |
| Ca | 10,505 | 11,432 | mg/L |
| Ca Hardness | 26,263 | 28,580 | mg/L |
| Mg | 1,034 | 1,122 | mg/L |
| Mg Hardness | 4,239 | 4,600 | mg/L |
| Total Hardness | 30,502 | 33,180 | mg/L |
| Total Iron | 52.2 | 61.7 | mg/L |
| Sulfates | 20 | 13 | mg/L |
| ATP | N/A | N/A | |
| Carbonate Alkalinity | 0.0 | 0.0 | mg/L |
| Bicarbonate Alkalinity | 292.8 | 292.8 | mg/L |
| Total | 292.8 | 292.8 | mg/L |
| Barium | 1,008.0 | 1,039.0 | mg/L |
| Strontium | 3,380.0 | 3,616.0 | mg/L |

The two samples (Pit #2 and Pit #3) analyzed in Table 3 then underwent an aeration process and were pumped into a common pit (Pit #1 in Table 4). Table 4 illustrates an analysis of the combined produced fluid samples after aeration, formation of Fenton's reagent in situ and flocculation has occurred. A sample of the produced fluid near the top of the pit (Pit #1 top) was analyzed as was a core sample of the produced fluid sample (Pit #1 top/bottom). As can be seen from Table 4, the iron content was drastically reduced. Moreover, the sample was observed to be clear, presumably due to the flocculation of the kerogen and residual polyacrylamide with simultaneous biofilm destruction.

TABLE 4

Produced Fluid Compositions After Aeration

| Analysis | Pit #1 top | Pit #1 top/bottom | units |
|---|---|---|---|
| pH | 5.45 | 5.39 | |
| Conductivity | 138,500 | 152,500 | μmhos/cm |
| Specific Gravity | 1.1 | N/A | |
| Fluid Density | 9.17 | N/A | lb/gal |
| Approx. Salt Percentage | 9.3 | 10.5 | % |
| Ca | 12,307 | 14,503 | mg/L |
| Ca Hardness | 30,767 | 36,259 | mg/L |
| Mg | 1,205 | 1,409 | mg/L |
| Mg Hardness | 4,941 | 5,775 | mg/L |
| Total Hardness | 35,708 | 42,034 | mg/L |
| Total Iron | 13 | 10.9 | mg/L |
| Sulfates | 10 | 20 | mg/L |
| ATP | N/A | N/A | |
| Carbonate Alkalinity | 0.0 | 0.0 | mg/L |
| Bicarbonate Alkalinity | 219.6 | 146.4 | mg/L |
| Total | 219.6 | 146.4 | mg/L |
| Barium | 1,622.0 | 1,883.4 | mg/L |
| Strontium | 3,996.3 | 4,536.0 | mg/L |

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

What is claimed is:

1. A method of reusing a produced fluid in a hydraulic fracturing operation, the method comprising:
   receiving the produced fluid from a well as a return of at least a hydraulic fracturing fluid in a hydraulic fracturing operation;
   providing a production brine recovered from an oil or gas extraction operation, the production brine having a conductivity of at least 150,000 μmhos/cm;
   measuring a conductivity of the produced fluid;
   treating the produced fluid by adding thereto at least the production brine to form a treated produced fluid, wherein the treating of the produced fluid comprises:
   increasing the conductivity of the produced fluid to at least 100,000 μmhos/cm;
   increasing an iron content of the produced fluid to at least 50 ppm; and adjusting the pH level of the produced fluid to between 5.0 and 6.5; and
   thereafter increasing an oxidation-reduction potential value of the produced fluid to at least 250 mV, thereby forming Fenton's reagent in situ within the treated produced fluid;
   storing the treated produced fluid for a sufficient time to allow flocculation of suspended solids in the treated produced fluid, thereby forming a clarified produced fluid from which the suspended solids have been removed; and
   injecting the clarified produced fluid into a well as part of a hydraulic fracturing fluid;
   wherein reaction of the Fenton's reagent causes formation of complexes of iron and the suspended solids; and wherein the formation of the complexes causes coagulation and flocculation of the suspended solids.

2. The method according to claim 1, wherein the treating step comprises increasing the conductivity of the produced fluid to at least 150,000 μmhos/cm.

3. The method according to claim 1, further comprising adding a friction reducer to the clarified produced fluid, the friction reducer being mixed with at least one of the clarified produced fluid or an aqueous solution for unwinding at least one hour before the step of injecting the clarified produced fluid into the well.

4. The method according to claim 3, further comprising, prior to injecting the hydraulic fracturing fluid into the well, injecting an acid composition comprising an acid and a friction reducer into the well.

5. The method according to claim 1, further comprising mixing the clarified produced fluid at a rate and frequency sufficient to prevent the occurrence of density-based striation.

6. The method of claim 1, wherein the iron content is controlled through the addition of an iron salt to the produced fluid.

7. The method of claim 1, wherein the oxidation-reduction potential value of the produced fluid is controlled by a factor selected from the group consisting of: addition of hydrogen peroxide, addition of peracetic acid, aeration of the produced fluid, and combinations thereof.

8. The method of claim 1, wherein the suspended solids are selected from the group consisting of kerogen, asphaltenes, acrylamide solids, and combinations thereof.

9. The method of claim 1, further comprising adding to the produced fluid a friction reducer.

10. The method of claim 9, wherein the friction reducer is selected from the group consisting of an acrylic-acid-AMPS-polyacrylamide terpolymer, a brine dispersion AMPS-polyacrylamide copolymer, a non-ionic polyacrylamide polymer, and combinations thereof.

11. The method of claim 9, wherein, prior to being added to the composition, the friction reducer is pre-treated in an aqueous solution to increase the hydration thereof.

12. The method of claim 1, further comprising adding to the produced fluid a scale inhibitor.

13. The method of claim 12, wherein the scale inhibitor is a sulphonated phosphinocarboxylic acid copolymer.

14. The method of claim 1, further comprising adding to the produced fluid an iron dispersant.

15. The method of claim 14, wherein the iron dispersant is a sulphonated, carboxylated, non-ionic terpolymer.

16. The method of claim 1, further comprising mixing the produced fluid at a rate and frequency sufficient to prevent the occurrence of density-based striation.

17. A hydraulic fracturing fluid, comprising fluid recovered from an oil or gas extraction operation treated in accordance with the method of claim 1.

18. The hydraulic fracturing fluid of claim 17, wherein the fluid recovered from an oil or gas extraction operation comprises flow back water and production brine.

19. The hydraulic fracturing fluid of claim 17, further comprising a hydraulic fracturing fluid material selected from the group consisting of a friction reducer, an iron dispersant, a scale inhibitor, and combinations thereof.

20. The hydraulic fracturing fluid of claim 1, further comprising a friction reducer, wherein the friction reducer is selected from the group consisting of an acrylic-acid-AMPS-polyacrylamide terpolymer, a brine dispersion AMPS-polyacrylamide copolymer, a non-ionic polyacrylamide polymer, and combinations thereof.

21. A system for preparing a hydraulic fracturing fluid, comprising, in series for fluid flow therebetween:
    a fluid source, comprising fluid recovered from an oil or gas extraction operation that has been treated in accordance with the method of claim 1;
    a friction reducer inlet for supplying a friction reducer; and
    a mixing apparatus.

22. The system of claim 21, further comprising a friction reducer holding tank for pre-treating the friction reducer in an aqueous solution.

23. The system of claim 21, further comprising an in-line conductivity analyzer between the fluid source and the mixing apparatus.

24. The system of claim 23, wherein data from the conductivity analyzer is provided to a feedback control system for adjusting the amount and type of friction reducer added to the hydraulic fracturing fluid.

25. A method of hydraulic fracturing, comprising:
    pre-treating a well by injecting an acid composition comprising an acid and a friction reducer into a well bore; and
    injecting a hydraulic fracturing fluid into the well bore, the hydraulic fracturing fluid comprising fluid recovered from an oil or gas extraction operation treated in accordance with the method of claim 1.

* * * * *